US007490458B2

(12) United States Patent
Ford

(10) Patent No.: US 7,490,458 B2
(45) Date of Patent: Feb. 17, 2009

(54) HORSE BOOT WITH DUAL TONGUE ENTRY SYSTEM

(75) Inventor: Garrett N. Ford, Tucson, AZ (US)

(73) Assignee: Easycare, Inc., Tucson, AZ (US)

( * ) Notice: Subject to any disclaimer, the term of this patent is extended or adjusted under 35 U.S.C. 154(b) by 741 days.

(21) Appl. No.: 10/755,984

(22) Filed: Jan. 13, 2004

(65) Prior Publication Data

US 2004/0168813 A1    Sep. 2, 2004

Related U.S. Application Data

(60) Provisional application No. 60/496,780, filed on Aug. 21, 2003, provisional application No. 60/446,628, filed on Feb. 11, 2003.

(51) Int. Cl.
*B68C 5/00* (2006.01)
(52) U.S. Cl. .......................................................... 54/82
(58) Field of Classification Search .................... 54/82; 168/18; 36/111
See application file for complete search history.

(56) References Cited

U.S. PATENT DOCUMENTS

| | | | |
|---|---|---|---|
| 26,832 A | 1/1860 | Carlin | |
| 65,231 A | 5/1867 | Jennings | |
| 167,895 A | 9/1875 | Hall | |
| 519,047 A * | 5/1894 | Rogers | 168/2 |
| 617,153 A * | 1/1899 | Galpin | 168/2 |
| 840,892 A * | 1/1907 | Adam | 168/1 |
| 1,043,978 A * | 11/1912 | John | 168/2 |
| 2,986,823 A * | 6/1961 | Kos | 36/7.1 R |
| 3,703,209 A * | 11/1972 | Glass | 168/18 |
| 3,732,929 A * | 5/1973 | Glass | 168/18 |
| 4,174,754 A * | 11/1979 | Glass | 168/18 |
| 4,290,487 A | 9/1981 | Unger | |
| 4,736,800 A | 4/1988 | Rohner | |
| 4,744,422 A * | 5/1988 | Dallmer | 168/18 |
| 4,981,010 A | 1/1991 | Orza et al. | |
| 5,148,657 A | 9/1992 | Stafford et al. | |
| 5,174,382 A * | 12/1992 | Wright | 168/28 |
| 5,224,549 A | 7/1993 | Lightner | |
| 5,528,885 A | 6/1996 | Chamberlain | |
| 5,588,288 A | 12/1996 | Origgi et al. | |
| 5,661,958 A | 9/1997 | Glass et al. | |
| 5,715,661 A * | 2/1998 | Meyers | 54/82 |
| 5,934,599 A | 8/1999 | Hammerslag | |
| 6,202,953 B1 | 3/2001 | Hammerslag | |
| 6,289,558 B1 | 9/2001 | Hammerslag | |
| 6,694,713 B1 * | 2/2004 | MacDonald | 54/82 |

FOREIGN PATENT DOCUMENTS

| | | | |
|---|---|---|---|
| GB | 1408336 | * | 10/1975 |
| GB | 2397483 A | * | 7/2004 |
| WO | WO 00/16614 | | 3/2000 |
| WO | WO 2004/047526 A1 | * | 10/2004 |

* cited by examiner

*Primary Examiner*—Son T. Nguyen
(74) *Attorney, Agent, or Firm*—Antonia R. Durando

(57) ABSTRACT

A boot for a horse has two tongues which are located opposite one another and allow the boot to be opened exceptionally wide.

11 Claims, 4 Drawing Sheets

HORSE BOOT WITH DUAL TONGUE ENTRY SYSTEM

REFERENCE TO RELATED APPLICATION

This application is based on provisional applications Ser. No. 60/496,780 filed 21 Aug. 2003 entitled "Horse Boot With Dual Tongue Entry System" and Ser. No. 60/446,628 filed 11 Feb. 2003 entitled "Horse Boot."

BACKGROUND OF THE INVENTION

1. Field of the Invention

The invention relates to an article of footwear for an animal.

2. Description of the Prior Art

Horse boots are used to protect the hooves and fetlocks of horses and are sometimes used in lieu of horseshoes. A horse boot typically includes a sole with opposed flat major surfaces and an upper which projects from one of the major surfaces and forms an enclosure for the hoof and fetlock of a horse. The upper extends along the rim of the sole and has an edge which is secured to the sole. The upper has a second edge remote from the sole, and such edge is provided with a cuff which can be tightened around the fetlock of the horse.

The upper and cuff can be spread in order to put the boot on the hoof and fetlock of the horse. After spreading the upper and the cuff, the boot is slid over the hoof and fetlock and the cuff is tightened to secure the boot in place.

The process of putting a boot on a horse is cumbersome because of the relatively large size of the fetlock in comparison to the bottom portion of the leg and because of the limited amount of stretch available when opening the boot. In most cases, the boot has a front tongue which permits expansion of the upper and cuff to facilitate the process of putting on the boot. Nevertheless, the opening is never sufficiently large for easy installation. While it is possible to make the upper and cuff so large that the boot can be put on easily, it then becomes difficult to tighten the boot uniformly or to tighten the boot sufficiently to avoid movement of the boot and rubbing of the latter against the fetlock of the horse.

SUMMARY OF THE INVENTION

One aspect of the invention resides in article of footwear for an animal. The article comprises a support for a leg of the animal and for bearing against the ground. The article further comprises an enclosure for enclosing at least part of the leg of the animal, and the enclosure includes a wall on the support.

In one embodiment of the article, the enclosure additionally includes a tongue on the support movable relative to the wall and at least one band of elastic material connected to the tongue and the wall.

The tongue may have a pair of opposed edges and the elastic band can then join one of the edges to the wall. The enclosure may here include a second band of elastic material which joins the other of the edges to the wall.

In another embodiment of the article, the enclosure comprises a pair of tongues on the support movable relative to the wall. The tongues are preferably located diametrically opposite one another.

The enclosure in this embodiment may further include at least one band of pleated material connected to one of the tongues and to the wall. It is also possible for the enclosure to include at least one band of elastic material which is connected to one of the tongues and to the wall.

Each of the tongues may have opposed edges and the edges of one tongue can be joined to the wall by respective bands of pleated material. The edges of the other tongue may be joined to the wall via respective bands of elastic material.

A protrusion may be provided on one of the tongues to facilitate manipulation of such tongue. The protrusion can be in the form of a strap and may define a loop.

The article of footwear advantageously comprises means for tightening the enclosure around the leg of the animal. The tightening means may include a tightening element which engages the enclosure, and an operating element for exerting a force on the tightening element so that the tightening element tightens the enclosure around the leg of the animal. The tightening element may pass through the wall and be slidable relative thereto.

The operating element can comprise a rotary mechanism and may be mounted on the wall. In the latter embodiment, the operating element can alternatively be mounted on one of the tongues. A cover may be provided for at least part of the tightening means and such cover can be designed to overlie the operating element so as to protect the latter.

Additional features and advantages of the invention will be forthcoming from the following detailed description of certain specific embodiments when read in conjunction with the accompanying drawings.

DESCRIPTION OF THE PREFERRED EMBODIMENTS

Figure 1:
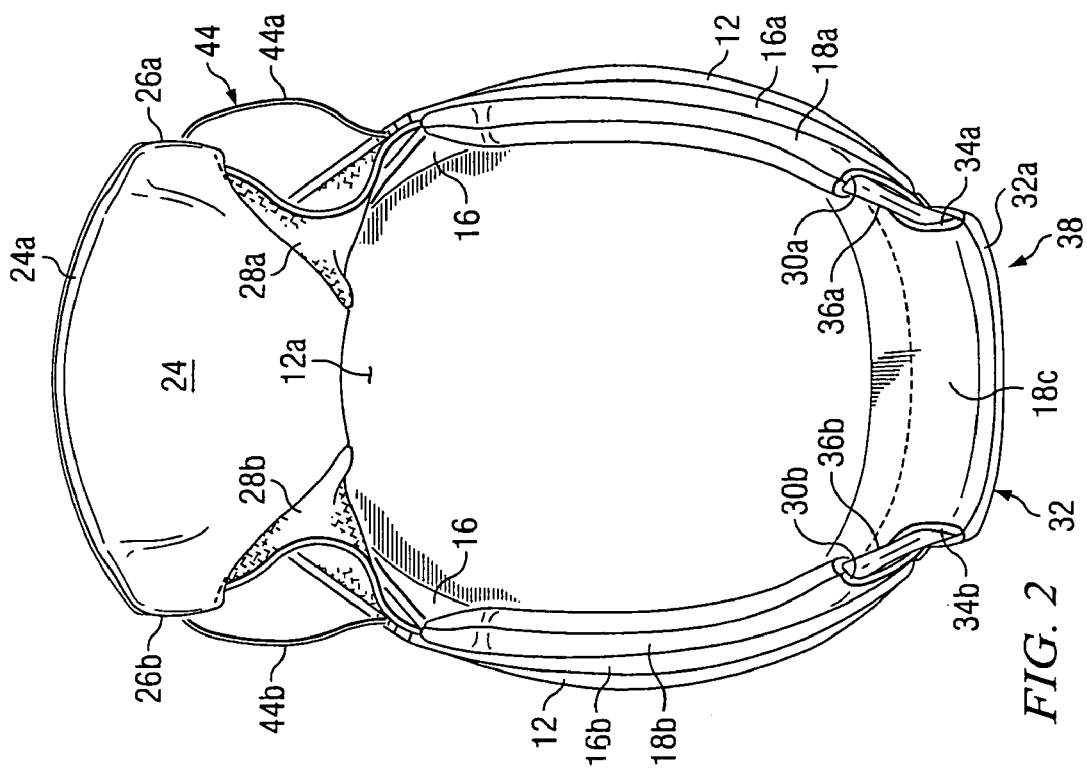
FIG. 1 is a perspective view of animal footwear in accordance with the invention as seen from a front corner of the footwear.
Figure 2:
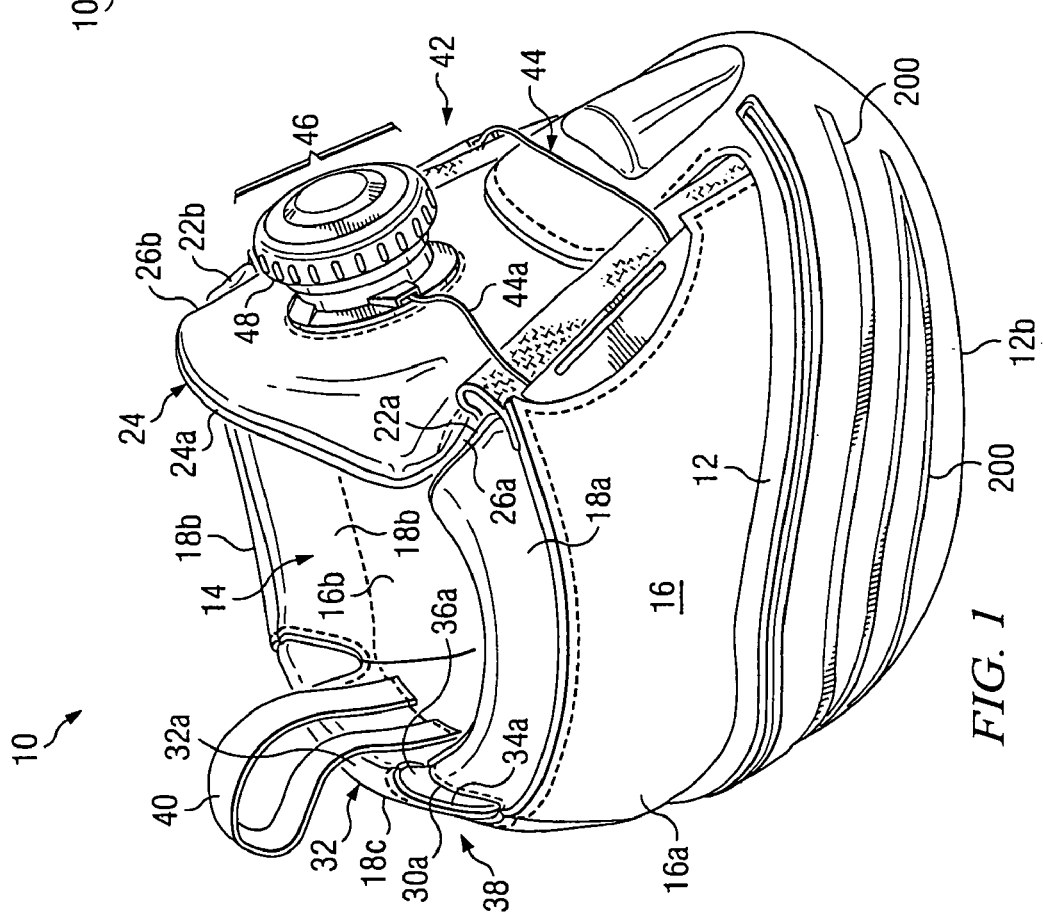
FIG. 2 is a plan view of the footwear of FIG. 1 in an open condition.
Figure 3:
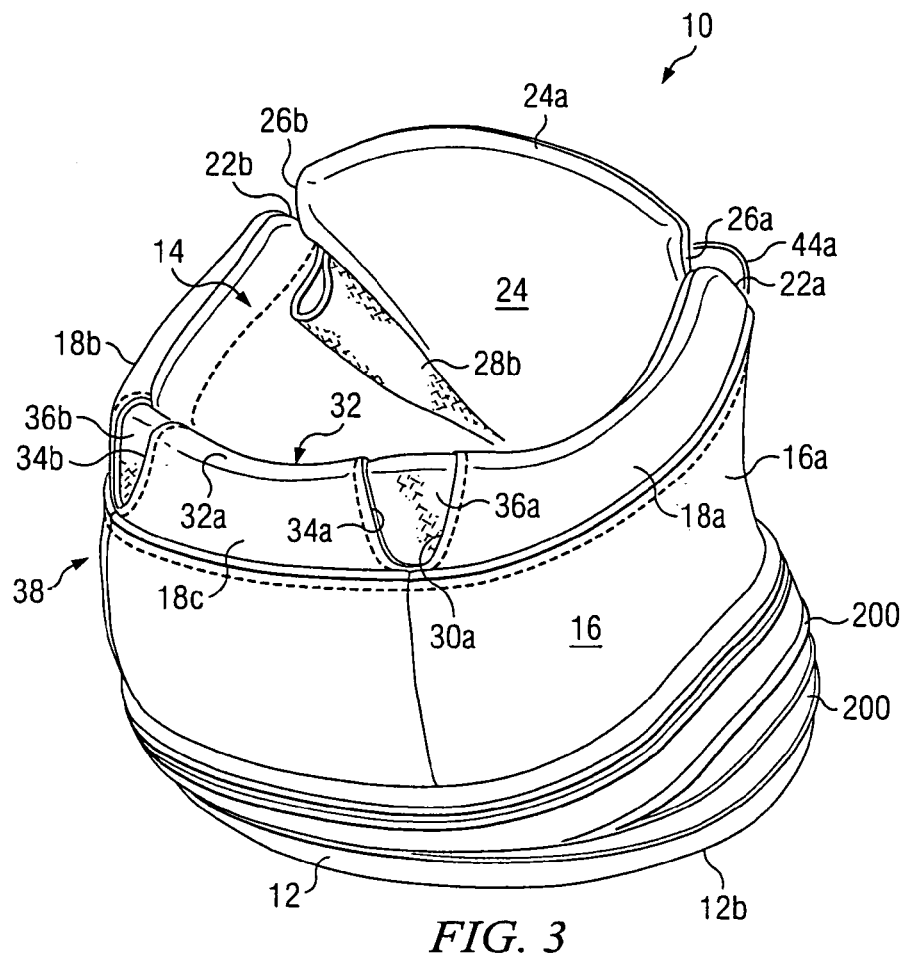
FIG. 3 is a perspective view of the footwear of FIG. 1 as seen from a rear corner of the footwear.

Referring to FIGS. 1-3, the numeral 10 identifies an article of footwear which is intended to be worn by an animal and is designed in accordance with the invention. The article of footwear 10 is here a boot to be worn on one of the legs of a horse.

The boot 10 comprises a sole or support 12 which supports the leg of the horse and bears against the ground when the boot 10 is being worn. The sole 12 has opposed major surfaces 12a and 12b, and the major surface 12a faces upward and contacts the hoof of the supported leg during use while the major surface 12b faces downward and contacts the ground during use.

The boot 10 further comprises an enclosure 14 which is designed to receive and enclose the lower portion of the leg of the horse including the hoof. The enclosure 14 is secured to the upward facing major surface 12a of the sole 12 or to a rim which is attached to the sole 12 and projects beyond the upward facing major surface 12a.

The enclosure 14 extends along the perimeter of the sole 12 and includes a wall or panel which projects from the upward facing major surface 12a of the sole 12 or from a rim on the sole 12. The wall comprises an upper 16 having an edge which faces away from the sole 12 and is divided into two sections 16a and 16b.

The enclosure 14 additionally includes a collar or cuff which is divided into several sections 18a, 18b and 18c. The collar sections 18a,18b, which constitute part of the wall containing the upper 16, are mounted on and run along the respective edge sections 16a, 16b of the upper 16.

The upper 16 can be made of leather or textile and may, for example, be attached to the sole 12 by stitching and gluing.

The wall 16, 18a, 18b defines a forward gap at the front of the boot 10 and has two spaced edges 22a and 22b which are transverse to the sole 12 and bound the forward gap laterally. The edge 22a runs along the upper 16 and the collar section 18a while the edge 22b runs along the upper 16 and the collar section 18b.

The enclosure 14 includes a tongue or flap 24 which is situated at the front of the boot 10 and is pivotable into and out of the forward gap. The tongue 24 has a free edge 24a which faces away from the sole 12, and the tongue 24 has another edge which is located opposite the free edge 24a in or near the forward gap and is attached to the upper 16 and the sole 12. The tongue 24 also has two opposed edges 26a and 26b which extend transversely of the free edge 24a and bound the tongue 24 laterally. The edges 26a,26b of the tongue 24 respectively face the edges 22a, 22b of the wall 16, 18a, 18b when the tongue 24 is in the forward gap.

A band 28a is attached to the wall 16, 18a, 18b at or near the edge 22a and to the tongue 24 at or near the edge 26a. Similarly, a band 28b is attached to the wall 16, 18a, 18b at or near the edge 22b and to the tongue 24 at or near the edge 26b. The bands 28a,28b, which form part of the enclosure 14, are preferably made of pleated or folded material which is arranged with the pleats or folds extending transverse to the sole 12.

The wall 16, 18a, 18b defines a rear gap at the back of the boot 10 and has two spaced edges 30a and 30b which are transverse to the sole 12 and bound the rear gap laterally. The edge 30a runs along the upper 16 and the collar section 18a while the edge 30b runs along the upper 16 and the collar section 18b.

The enclosure 14 includes a second tongue or flap 32 which is situated at the back of the boot 10 and can be considered to be located diametrically opposite the tongue 24, and the tongue 32 is pivotable into and out of the rear gap. The tongue 32 has a free edge 32a which faces away from the sole 12, and the tongue 32 has another edge which is located opposite the free edge 32a in or near the rear gap and is of one piece with the upper 16. The tongue 32 also has two opposed edges 34a and 34b which extend transversely of the free edge 32a and bound the tongue 32 laterally. The edges 34a, 34b of the tongue 32 respectively face the edges 30a, 30b of the wall 16, 18a, 18b when the tongue 32 is in the rear gap.

A band 36a is attached to the wall 16, 18a, 18b at or near the edge 30a and to the tongue 32 at or near the edge 34a. Similarly, a band 36b is attached to the wall 16, 18a, 18b at or near the edge 30b and to the tongue 32 at or near the edge 34b. The bands 36a,36b, which form part of the enclosure 14, are preferably made of elastic or stretchable material.

The tongue 32 here includes a section 38 which is integral with the upper 16, that is, the upper 16 and the tongue section 38 are both part of the same single piece of material. The tongue 32 further includes the collar section 18c which is attached to the tongue section 38. However, it is possible to eliminate the tongue section 38 and to have the tongue 32 constituted by the collar section 18c. In such an event, the portions of the elastic bands 36a, 36b extending from the collar sections 18a, 18b, 18c towards the sole 12 are eliminated.

The pleated bands 28a, 28b, as well as the elastic bands 36a,36b, can be referred to as gussets. The elastic bands 36a, 36b can also be referred to as darts.

While the bands 28a, 28b attached to the front tongue 24 and the bands 36a, 36b attached to the rear tongue 32 constitute preferred elements of the boot 10, the bands 28a, 28b and the bands 36a, 36b are not essential and could be eliminated.

The rear tongue 32 can be provided with a protrusion or projection 40 to make it easier to shift the tongue 32. The protrusion 40 is here a flexible strap or elongated member having two ends which are secured to the tongue 32 on the inside of the boot 10. The strap 40 defines a loop which can be grasped with the fingers.

A tightening system or tightening means 42 is provided to tighten the enclosure 14 about the leg of the horse. The tightening system 42, which is of the type disclosed in U.S. Pat. Nos. 5,934,599; 6,289,558; and 6,202,953, includes an elongated tightening element which is here in the form of a cable 44. The tightening system 42 further includes a rotary mechanism 46 which comprises a rotatable knob 48, and the cable 44 has two end portions 44a and 44b which are secured to the rotary mechanism 46 and project to opposite sides thereof. The rotary mechanism 46 is here mounted at the front of the boot 10 on the tongue 24 but could also be mounted on the upper 16 and could be located at the rear of the boot 10. The rotary mechanism 46 sits on the outer surface of the tongue 24.

The wall 16, 18a, 18b of the boot 10 is provided with a non-illustrated passage which runs alongside the edge 22a of the wall 16, 18a, 18b and a non-illustrated passage which runs alongside the opposite edge 22b. Each of the passages has an open upper end which faces away from the sole 12 of the boot 10 and an open lower end which faces towards the sole 12. From the end portion 44a of the cable 44, the cable 44 passes through the upper end of the passage adjoining the edge 22a of the wall 16, 18a, 18b and runs along the passage to the lower end thereof. The cable 44 exits the lower end of the passage adjoining the edge 22a and extends to the lower end of the passage adjoining the edge 22b where it enters such passage. The cable 44 runs along the passage adjoining the edge 22b to the upper end of the passage and exits the upper end of the passage where the cable 44 terminates in the end portion 44b.

The cable 44 is slidable relative to the wall 16, 18a, 18b in the passages adjoining the edges 22a, 22b of the wall 16, 18a, 18b. The rotary mechanism 46 is adapted to contemporaneously and uniformly pull the two end portions 44a, 44b of the cable 44 when the knob 48 is turned in a predetermined direction. This creates traction on the cable 44 which, in turn, produces a smooth and uniform tightening of the boot 10 around the hoof and the pastern or fetlock of the horse. Turning the knob 48 in the opposite direction from before releases the tension in the cable 44 thereby allowing the boot 10 to be removed from the horse.

The dual tongues 24, 32 permit the boot 10 to be easily opened beyond what is normally possible with single-tongue prior art boots and FIG. 2 illustrates the degree to which the boot 10 can be opened for easy installation over the hoof of the horse. The large degree to which the boot 10 can be opened enables the hoof of the horse to be inserted in and removed from the boot 10 with little or no force and without tools. Moreover, the dual tongues 24, 32 allow the boot 10 to fit snugly on the hoof when tightened. In addition, the dual tongues 24, 32 make it possible for the boot 10 to flex with the movement of the hoof thus inhibiting rubbing in the heel area.

Figure 4:
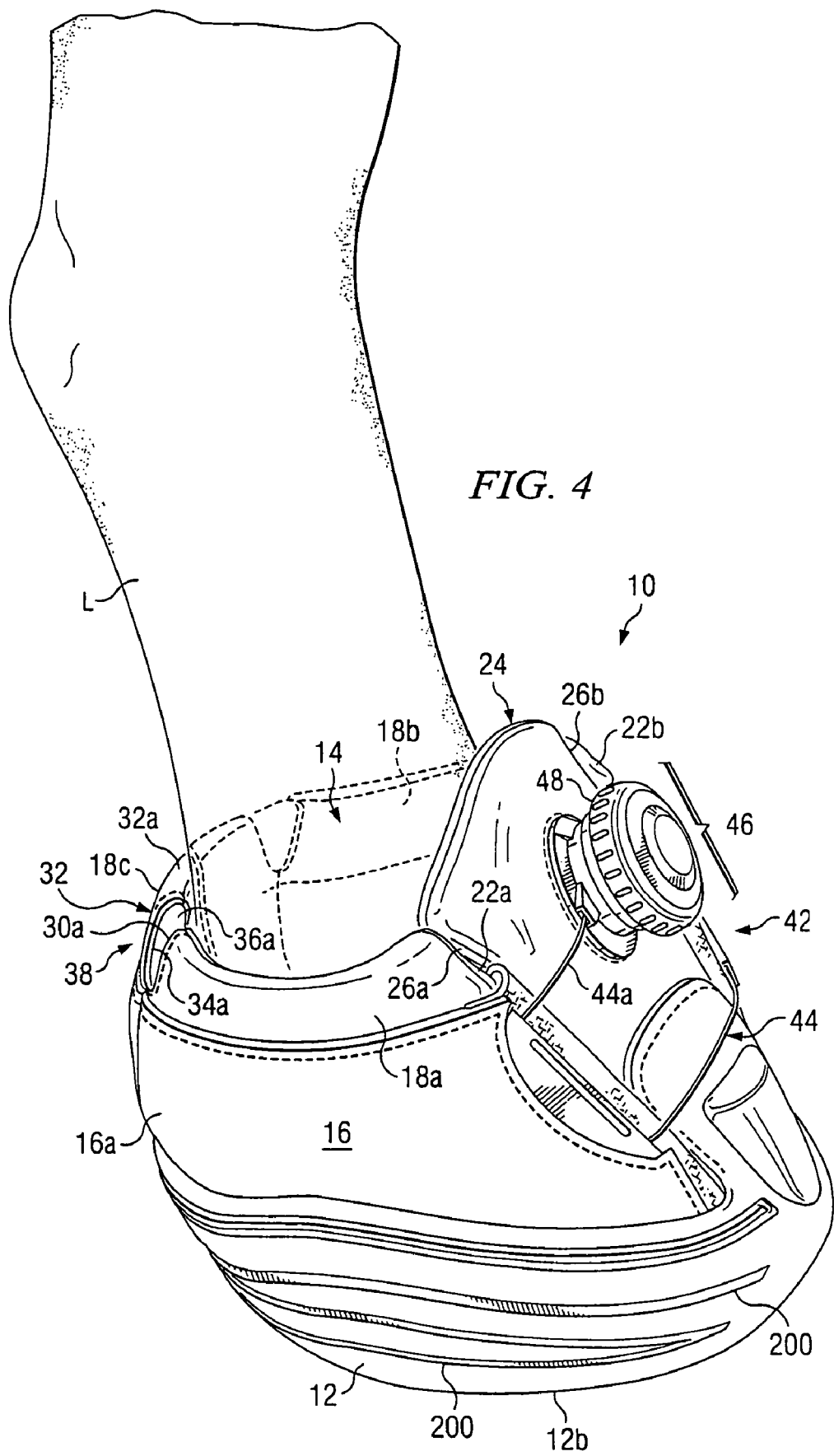
FIG. 4 is a perspective view of the footwear of FIG. 1, as seen from an upper lateral edge of the footwear, with the leg of an animal inserted in the footwear.

FIG. 4 shows the boot 10 installed on the leg L of the horse.

Referring to FIGS. 5-8, the numeral 50 identifies a protective cover for the tightening system 42. The cover 50 includes a central section 52 having a surface 52*a* which is adapted to face the boot 10 when the cover 50 is mounted on the rotary mechanism 46. The cover 50 further includes a tapering section 54 and a tapering section 56 which extend from the central section 52 to opposite sides of the central section 52. The tapering sections 54, 56 have respective surfaces 54*a* and 56*a* which are adapted to face the boot 10 when the cover 50 is mounted on the rotary mechanism 46, and the surfaces 54*a*, 56*a* are inclined to the surface 52*a* of the central section 52 in the same sense.

The cover 50 has an additional surface 58 which is adapted to face away from the boot 10 when the cover 50 is mounted on the rotary mechanism 46. The surface 58 extends along the tapering section 56, the central section 52 and part of the tapering section 54.

Figure 8:
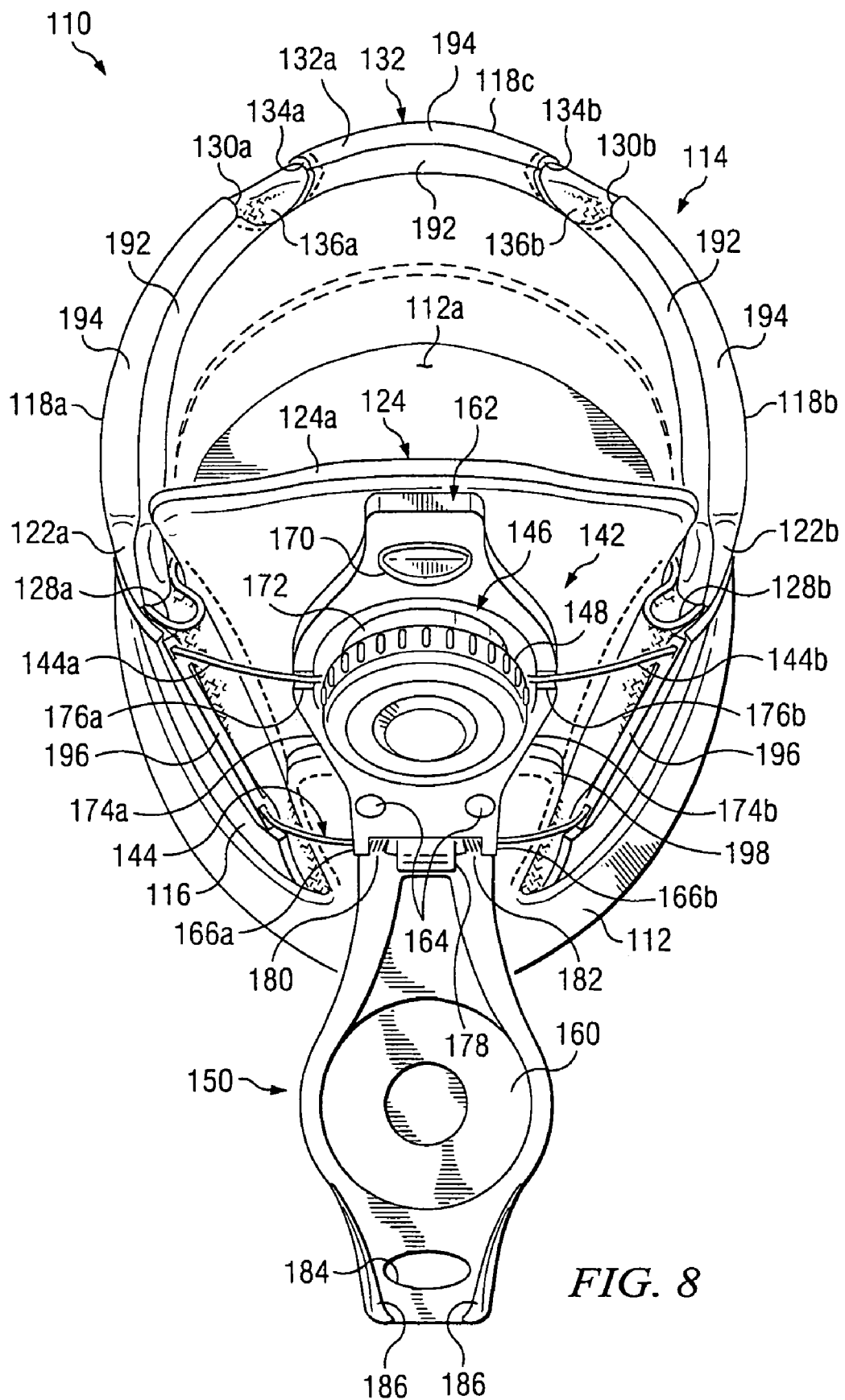
FIG. 8 is an end view of the cover of FIG. 5 as seen in the direction of the arrow A of FIG. 6.

As illustrated in FIG. 8, the surfaces 52*a*, 54*a*, 56*a*, 58 may be curved transversely of the cover 50 in conformance with the curvature of the leg of the horse.

Figures 5, 6, 7:
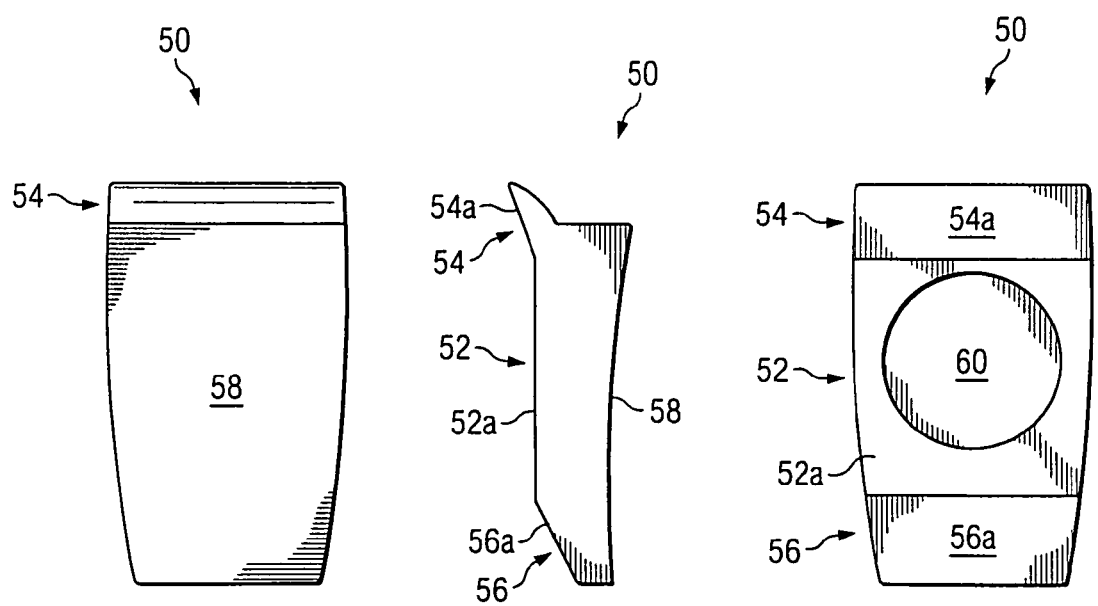
FIG. 5 is a front view of a cover for a tightening system on the footwear of FIG. 1.
FIG. 6 is a side view of the cover of FIG. 5.
FIG. 7 is a rear view of the cover of FIG. 5.

Considering FIG. 7, the surfaces 52*a* and 54*a* of the cover 50 are provided with an opening 60. The opening 60 is designed to receive the knob 48 of the rotary mechanism 46 with a friction fit so that the cover 50 can be removably mounted on the rotary mechanism 46. The cover 50 can be arranged to overlie the rotary mechanism 46 and the exposed portions of the cable 44 after the boot 10 has been fastened to the hoof of the horse in order to shield the rotary mechanism 46 and the exposed portions of the cable 44.

The cable tightening system 42 can be replaced by another tightening system such as a lace system or buckle system.

While the invention has been shown and described herein with reference to what are believed to be the most practical embodiments, it is recognized that departures can be made within the scope of the invention and, therefore, the invention is not to be limited to the details disclosed herein but is to be accorded the full scope of equivalent articles.

I claim:

1. An article of footwear for a hoofed animal comprising:
   a support designed to bear against a hoof of the animal and against the ground; and
   an enclosure designed to enclose at least part of the hoof of the animal, said enclosure including a wall on said support, and said enclosure further including a pair of tongues each of which is of one piece with said support and each of which has a major portion which is-pivotable relative to said wall.

2. The article of claim 1, further comprising a protrusion on one of said tongues to facilitate manipulation of said one tongue.

3. The article of claim 2, wherein said protrusion comprises a strap.

4. The article of claim 2, wherein said protrusion defines a loop.

5. The article of claim 1, further comprising a removable cover for at least part of said tightening means.

6. The article of claim 1, wherein said tightening means comprises a tightening element which engages said enclosure and an operating device designed to exert a force on said tightening element so as to draw said enclosure around the hoof of the horse.

7. The article of claim 6, further comprising a removable cover for at least part of said operating device.

8. The article of claim 6, wherein said operating device comprises a rotary mechanism.

9. The article of claim 6, wherein said operating device is mounted on said wall.

10. The article of claim 6, wherein said operating device is mounted on one of said front tongue.

11. The article of claim 6, wherein said tightening element passes through said wall and is slidable relative thereto.

* * * * *

UNITED STATES PATENT AND TRADEMARK OFFICE
CERTIFICATE OF CORRECTION

PATENT NO.       : 7,490,458 B2  Page 1 of 1
APPLICATION NO.  : 10/755984
DATED            : February 17, 2009
INVENTOR(S)      : Garrett N. Ford It is certified that error appears in the above-identified patent and that said Letters Patent is hereby corrected as shown below:

In Claim 10, second line, delete "one of" from the line.

Signed and Sealed this

Second Day of June, 2009

JOHN DOLL
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 7,490,458 B2 | Page 1 of 1 |
| APPLICATION NO. | : 10/755984 | |
| DATED | : February 17, 2009 | |
| INVENTOR(S) | : Garrett N. Ford | |

It is certified that error appears in the above-identified patent and that said Letters Patent is hereby corrected as shown below:

Column 6, in Claim 10, line 35, delete "one of" from the line.

This certificate supersedes the Certificate of Correction issued June 2, 2009.

Signed and Sealed this

Twenty-third Day of June, 2009

JOHN DOLL
*Acting Director of the United States Patent and Trademark Office*